(12) United States Patent
Gandhi et al.

(10) Patent No.: US 11,343,437 B2
(45) Date of Patent: May 24, 2022

(54) REDUCING POWER CONSUMPTION FOR ENHANCED ZERO SHUTTER LAG

(71) Applicant: GoPro, Inc., San Mateo, CA (US)

(72) Inventors: Ojas Gandhi, Fremont, CA (US); Naveen Chinya Krishnamurthy, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/142,827

(22) Filed: Jan. 6, 2021

(65) Prior Publication Data
US 2021/0127050 A1 Apr. 29, 2021

Related U.S. Application Data

(63) Continuation of application No. 16/240,009, filed on Jan. 4, 2019, now Pat. No. 10,917,582.

(51) Int. Cl.
H04N 5/235 (2006.01)
H04N 5/232 (2006.01)
(52) U.S. Cl.
CPC ....... H04N 5/2353 (2013.01); H04N 5/23241 (2013.01)
(58) Field of Classification Search
CPC ............. H04N 5/2353; H04N 5/23241; H04N 5/232411; H04N 5/23245; H04N 5/2252
See application file for complete search history.

(56) References Cited

U.S. PATENT DOCUMENTS

| 6,359,547 | B1 | 3/2002 | Denison | |
| 2011/0261228 | A1 | 10/2011 | Peng | |
| 2012/0169594 | A1 | 7/2012 | Zhao | |
| 2013/0135499 | A1 | 5/2013 | Song | |
| 2013/0258122 | A1 | 10/2013 | Keane | |
| 2014/0320698 | A1* | 10/2014 | Karivaradaswamy | H04N 5/772 348/231.99 |
| 2015/0138406 | A1 | 5/2015 | Sokeila | |
| 2015/0364158 | A1* | 12/2015 | Gupte | H04N 5/77 386/223 |
| 2018/0191993 | A1 | 7/2018 | Gera | |
| 2018/0343414 | A1* | 11/2018 | Bandwar | H04N 1/2137 |
| 2019/0095422 | A1* | 3/2019 | Chiang | G06F 40/114 |

* cited by examiner

Primary Examiner — Luong T Nguyen
(74) Attorney, Agent, or Firm — Young Basile Hanlon & MacFarlane, P.C.

(57) ABSTRACT

An image capture device includes a processor that is configured to set the image capture device to a zero-shutter-lag (ZSL) mode in response to a capture of a first image; start a timer; restart the timer when a second image is captured while the timer is active; and, in response to detecting an event indicating that no image was captured before the timer expired, set the image capture device to the non-ZSL mode. The processor is configured to set the image capture device to a non-ZSL mode when the timer expires.

20 Claims, 10 Drawing Sheets

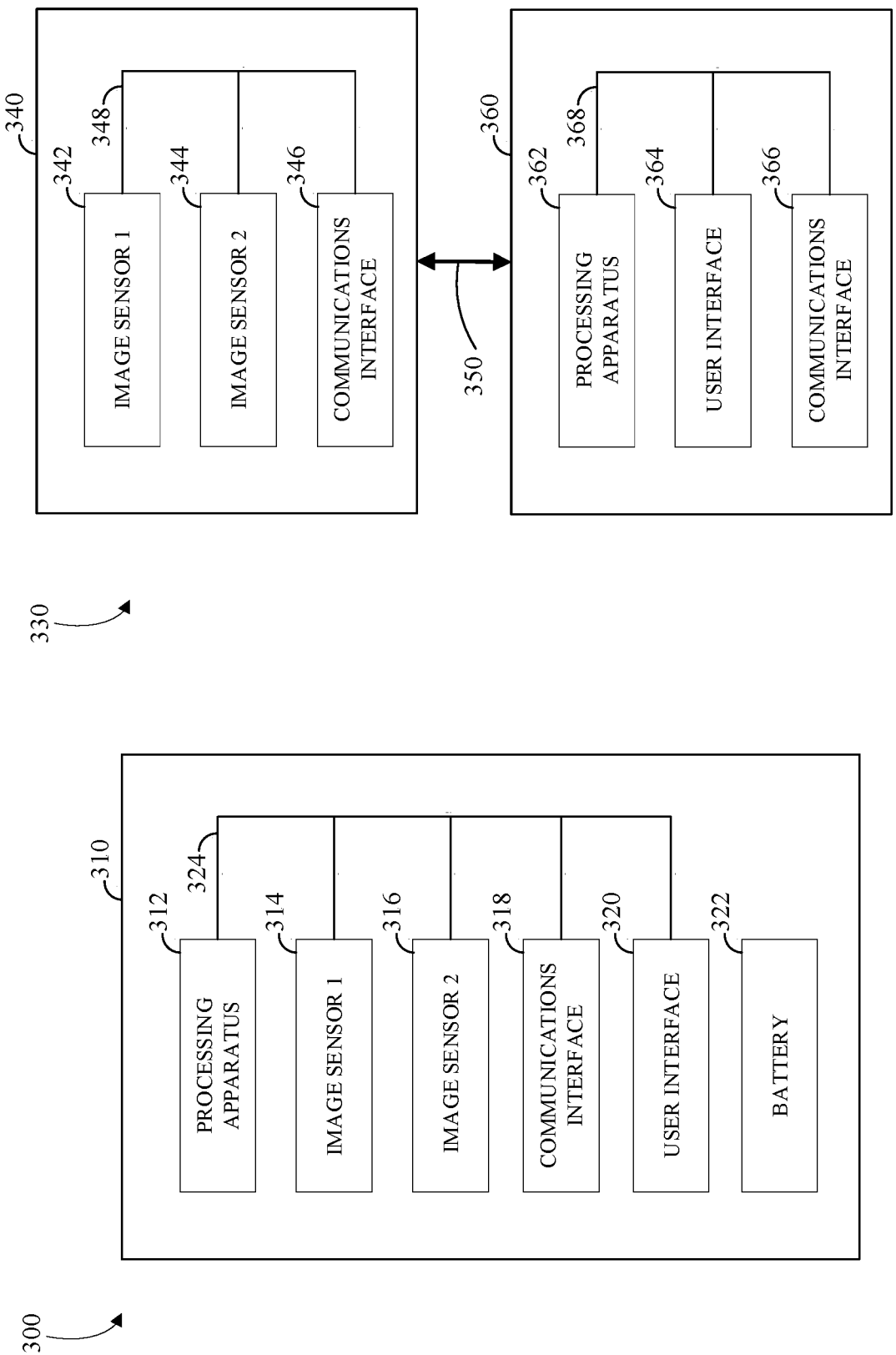

REDUCING POWER CONSUMPTION FOR ENHANCED ZERO SHUTTER LAG

CROSS-REFERENCE TO RELATED APPLICATION(S)

This application is a continuation of U.S. application patent Ser. No. 16/240,009, filed Jan. 4, 2019, the entire disclosure of which is hereby incorporated by reference.

TECHNICAL FIELD

This disclosure relates in general to image capture devices, and more specifically to preserving battery life of the image capture devices.

BACKGROUND

Image capture devices (such as cameras, mobile phones that are equipped with cameras, and the like) may operate in different modes. Some modes consume more battery energy than other modes. For example, when an image capture mode is operating in zero shutter-lag mode, more battery energy is consumed than when the image capture device is not operating in zero shutter-lag mode. Extending the battery life of an image capture device is critical to optimizing the user experience of the image capture device.

SUMMARY

Disclosed herein are implementations of reducing power consumption for enhanced zero shutter-lag.

An aspect is an image capture device that includes a processor. The processor is configured to set the image capture device to a zero-shutter-lag (ZSL) mode in response to a capture of a first image; start a timer; restart the timer when a second image is captured while the timer is active; and, in response to detecting an event indicating that no image was captured before the timer expired, set the image capture device to the non-ZSL mode. The processor is configured to set the image capture device to a non-ZSL mode when the timer expires.

Another aspect is a method that includes setting a camera to a zero-shutter-lag (ZSL) mode when the camera is turned on; starting a timer; storing first preview images having a first resolution in a buffer of the camera; and, in response to the timer expiring, setting the camera to a non ZSL mode; and storing second preview images in the buffer of the camera. The second preview images have a second resolution that is lower than the first resolution.

Another aspect is a non-transitory computer-readable storage medium that includes executable instructions that, when executed by a processor, facilitate performance of operations. The operations include operations to set an apparatus to a zero-shutter-lag (ZSL) mode in response to a capture of a first image; set a timer; reset the timer when a second image is captured while the timer is running; and, in response to detecting an event indicative of the non-ZSL mode, set the apparatus to the non-ZSL mode. The apparatus is set to a non-ZSL mode when the timer expires.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
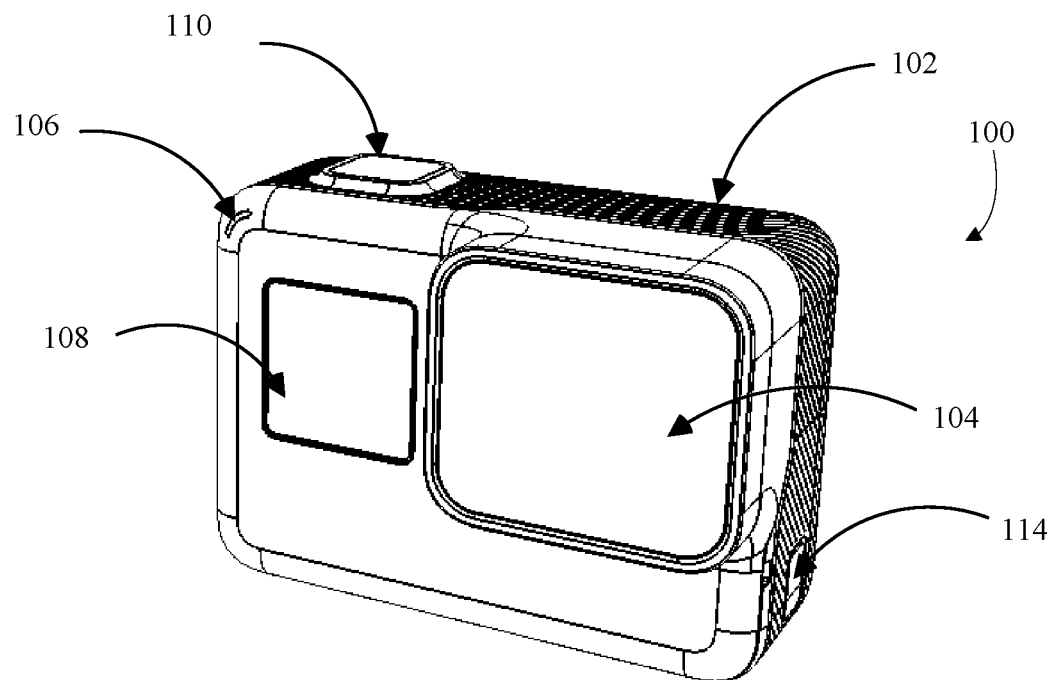
FIGS. 1A-D are isometric views of an example of an image capture device.
Figure 1B:
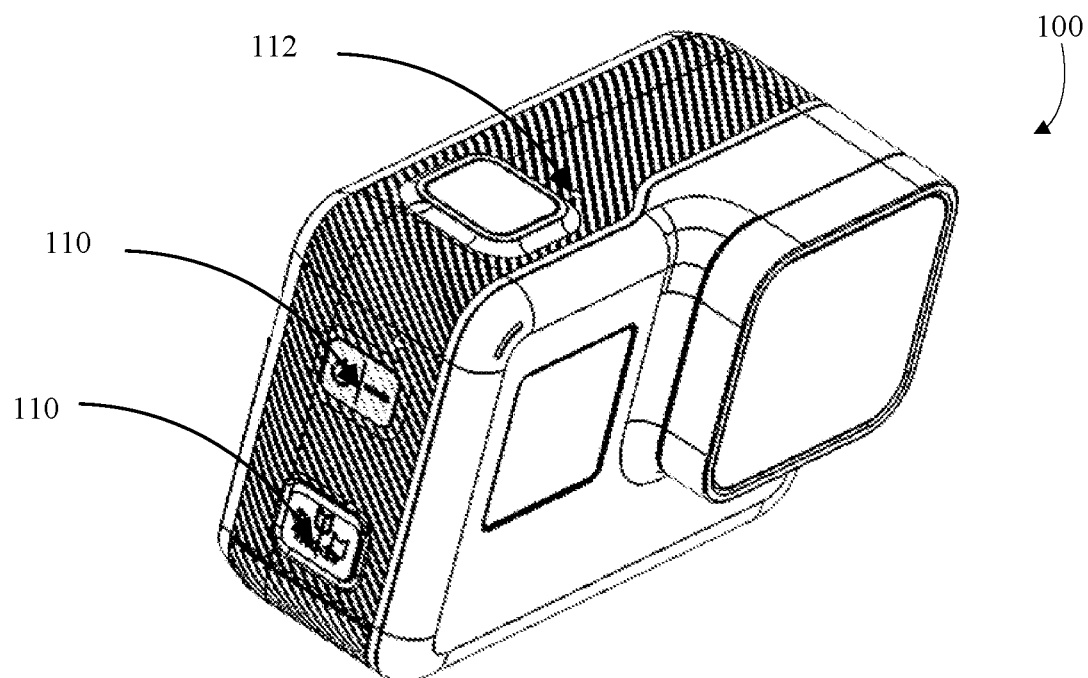
Figure 1C:
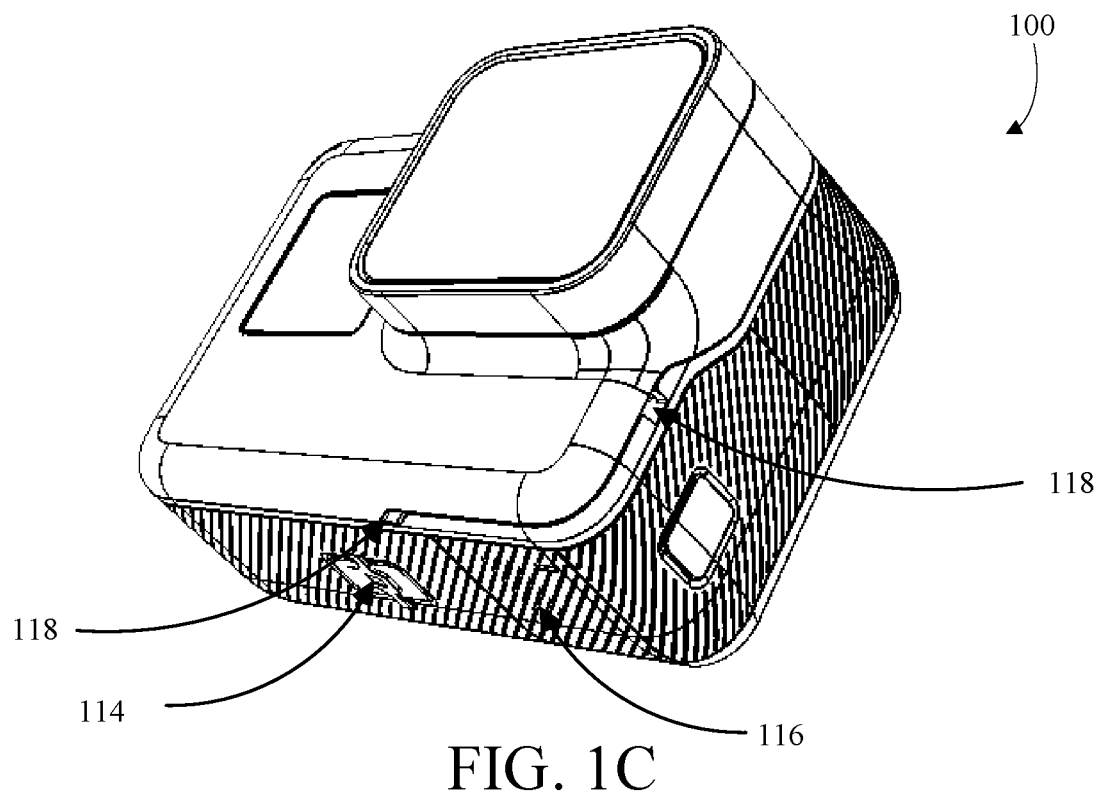
Figure 1D:
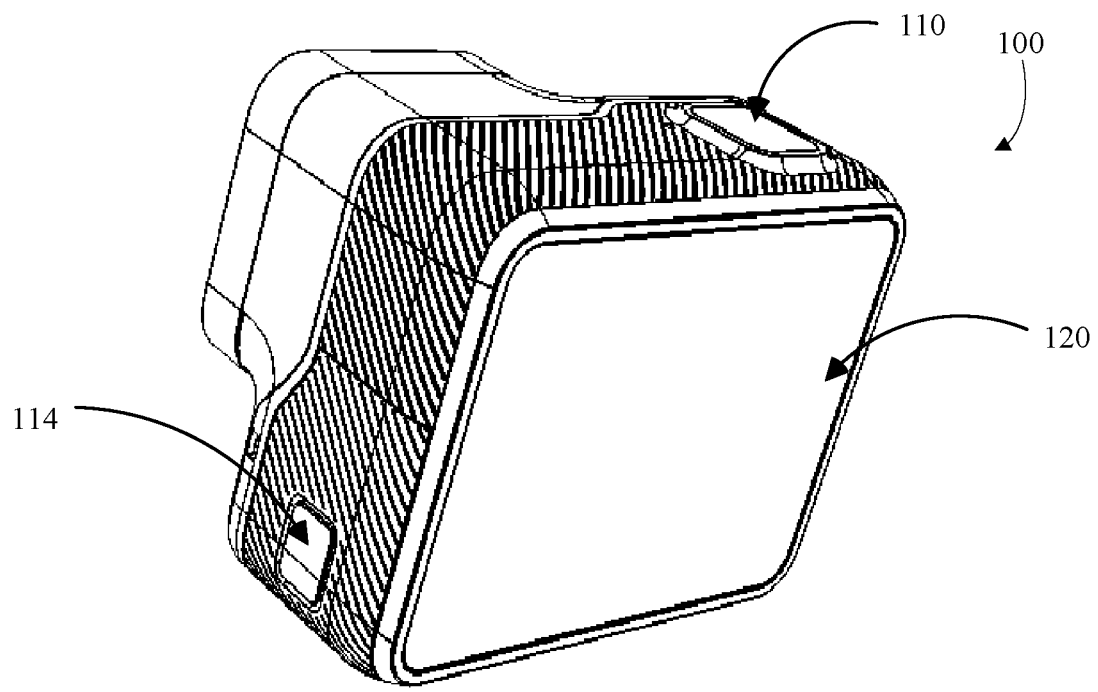

To capture a photo at a high resolution, some image capture devices can be constantly operating in a high-resolution mode. For example, while a user of the image capture device is framing the photo (e.g., framing the scene to be captured), the image capture device can be running at high resolution. Since the image capture device is already operating at the high resolution, when the user captures (such as by pressing a shutter button) a photo, the photo is instantaneously captured. This mode can be referred to as a zero shutter-lag (ZSL) mode. In the ZSL mode, an image can be immediately captured when, for example, a shutter close event is received. The shutter close (i.e., the shutter press) event can be generated, for example, in response to the mechanical closing of shutter so that other one or more modules of the image capture device that may relate to the capturing of a photo can function appropriately, as further described below. The shutter press event can be generated immediately after, immediately before, or otherwise contemporaneously with the closing of the shutter.

However, constantly operating at high resolution can be costly, such as in terms of battery usage. That is, constantly operating in the ZSL mode can significantly impact the user experience of the image capture device. In an illustrative example, assume that the user desires to use the image capture device to capture important moments of a football game. The average football game lasts 3 hours and 12 minutes. However, having the image capture device be in constant ZSL mode may reduce the battery life to, for example, one hour and 30 minutes. As such, more than half of the football game cannot be captured by the user since the battery of the image capture device runs out. As such, the user experience impact of the ZSL mode can be severe.

Some image capture devices may include a preview mode. In the preview mode, a photo is not typically being captured. In the preview mode, the user of an image capture device can, for example, frame a picture before pressing a button to actually capture the picture. The pressing of the button can cause a shutter close event to be generated and the photo captured. When the shutter close event is received, one or more components of the image capture device may be set (e.g., configured, prepared, etc.) to capture the image at a higher resolution. For example, when the shutter close event is received, sensors of the image capture device may be switched to a higher resolution. For example, when the shutter close event is received, an image processing pipeline may be set for capturing, processing, and saving the image. As such, the image capture device is switched to a photo capture mode. Switching to the photo capture mode can be a costly operation. That is, for example, a delay is associated with switching the image capture device to the photo capture mode. In an example, the delay can vary from several hundred milliseconds to one second, or more. This delay can be referred to as the shutter lag.

As battery life can be a major concern during the use of an image capture device, implementations according to this disclosure can balance battery life with having the image capture device be in ZSL mode by detecting (e.g., inferring) when the user is likely to capture a photo. As such, the battery life can be extended, and the user can make use of the image capture device for as long as possible. Implementations according to this disclosure can maintain an image capture device in a non-ZSL mode and, upon detecting that the user intends (e.g., is likely) to capture a photo, the image capture device is set to the ZSL mode. Additionally, according to implementations of this disclosure, while the image capture device is in ZSL mode, the image may be reset to a non-ZSL mode in order to preserve the battery life. In the non-ZSL mode, the image capture device is in a low energy consumption mode (e.g., in a normal and/or lower power preview mode). Implementations according to this disclosure can detect (e.g., determine, infer, conclude, decide, etc.), based on an event, that a user is about to capture a photo and, based on the event, change the state of the image capture device from a non-ZSL to the ZSL mode.

Implementations of this disclosure can set (e.g., start, configure, etc.) a timer when it is detected that the image capture has entered or is likely to enter the ZSL mode. If an event that is consistent with the ZSL mode is not received before the expiration of the timer, then the image capture device can be set to a non-ZSL mode. On the other hand, if an event that is consistent with the ZSL mode is received before the expiration of the timer, then the timer is reset (i.e., starts anew) and the image capture device is maintained in the ZSL mode. In an example, the event that is consistent with the ZSL mode can the receipt of a shutter close event, such as when the user captures a photo by pressing the shutter button.

As will be further explained below, in the ZSL mode, image sensors operate at a high resolution and an image processing pipeline, which may at least partially use a system-on-chip (SoC) component are used. Operating the image sensors at high resolution and configuring and using the SoC component can each have a significant impact on battery energy. For example, in the non-ZSL mode, an image sensor can use 70 mW; whereas in the ZSL mode, the image sensor can use 250 mW. As such, significant energy can be preserved by switching to the non-ZSL mode.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. A side of the image capture device 100 may include an I/O interface 114. The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
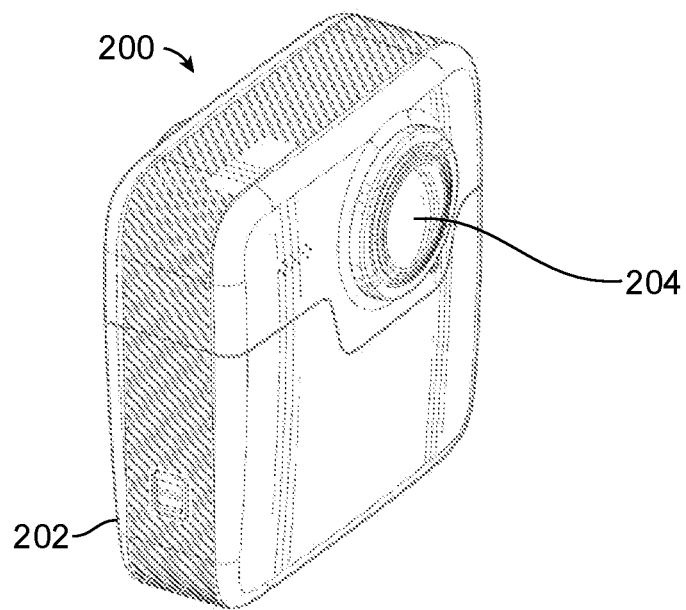
FIGS. 2A-B are isometric views of another example of an image capture device.
Figure 2B:
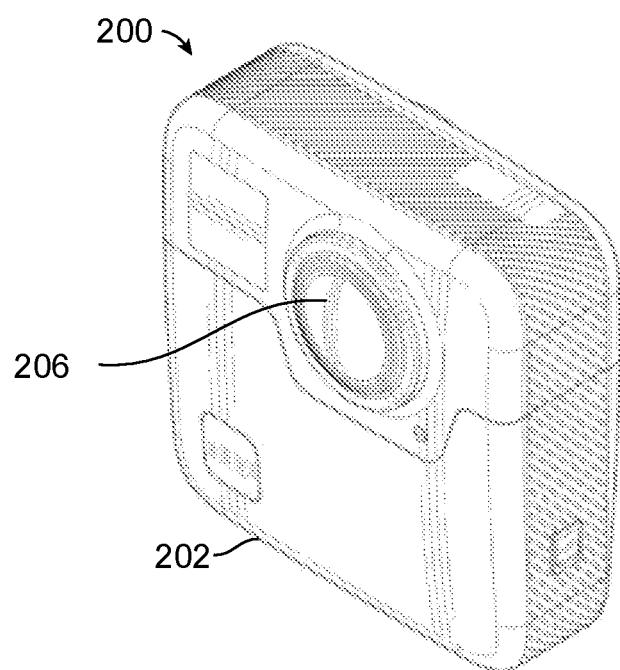

FIGS. 2A-B illustrate an image capture device 200 according to one embodiment. The image capture device 200 comprises a camera body 202 having two camera lenses 204, 206 structured on front and back surfaces of the camera body 202, various indicators on the front and/or back surface of the camera body 202 (such as LEDs, displays, and the like), various input mechanisms (such as buttons, switches, microphones, and touch-screen mechanisms), and electronics (e.g., imaging electronics, power electronics, etc.) internal to the camera body 202 for capturing images via the camera lenses 204, 206 and/or performing other functions. The two lenses 204, 206 are oriented in opposite directions and couple with two images sensors mounted on circuit boards (not shown). Other electrical camera components (e.g., an image processor, camera SoC (system-on-chip), etc.) may also be included on one or more circuit boards within the camera body 202 of the image capture device 200.

Figure 2C:
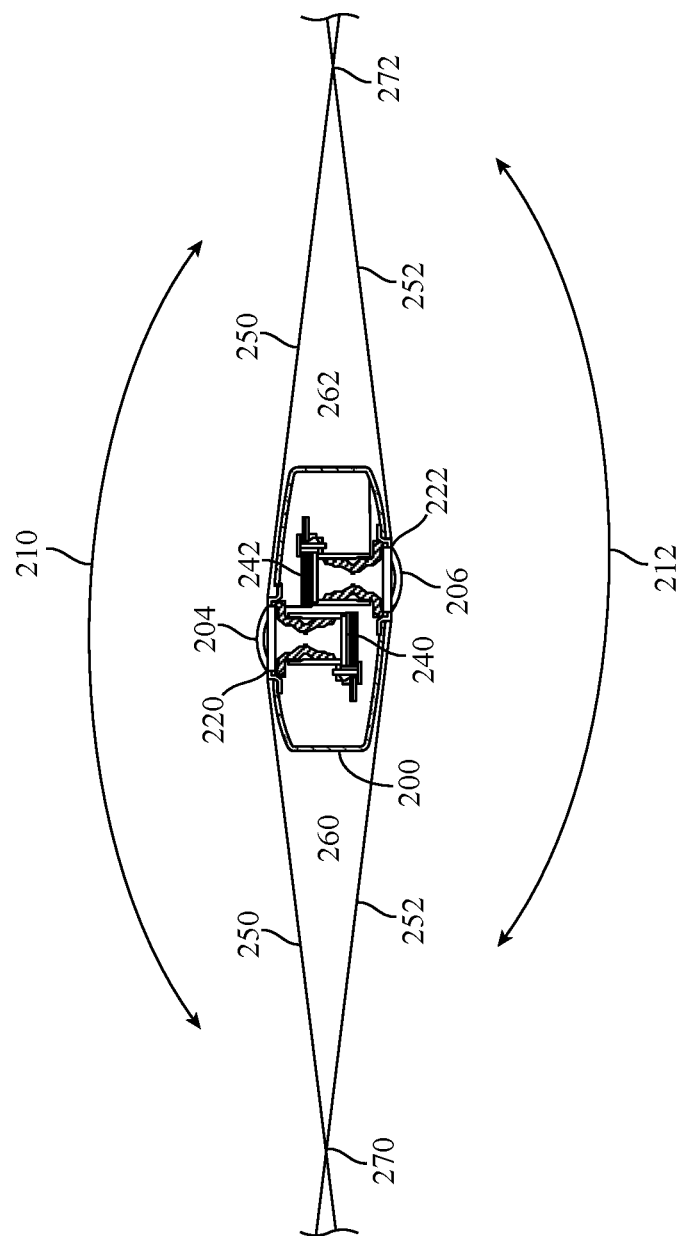
FIG. 2C is a cross-sectional view of the image capture device of FIGS. 2A-B.

FIG. 2C is a cross-sectional view of the image capture device 200 of FIGS. 2A-B. In some implementations, the image capture device 200 may be a spherical image capture device with fields-of-view 210, 212 as shown in FIG. 2C. For example, the image capture device 200 may include image capture devices 220, 222, related components, or a combination thereof, arranged in a back-to-back or Janus configuration. For example, a first image capture device 220 may include the first lens 204 and a first image sensor 240, and a second image capture device 222 may include the second lens 206 and a second image sensor 242 arranged oppositely from the first lens 204 and the first image sensor 240.

The first lens 204 of the image capture device 200 may have the field-of-view 210 shown above a boundary 250. Behind the first lens 204, the first image sensor 240 may capture a first hyper-hemispherical image plane from light entering the first lens 204, corresponding to the first field-of-view 210.

The second lens 206 of the image capture device 200 may have a field-of-view 212 as shown below a boundary 252. Behind the second lens 206, the second image sensor 242 may capture a second hyper-hemispherical image plane from light entering the second lens 206, corresponding to the second field-of-view 212.

One or more areas, such as blind spots 260, 262, may be outside of the fields-of-view 210, 212 of the lenses 204, 206, light may be obscured from the lenses 204, 206 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 204, 206, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A slight change in the alignment, such as position and/or tilt, of the lenses 204, 206, the image sensors 240, 242, or both, may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 204, 206 and the image sensors 240, 242 such that the fields-of-view 210, 212, stitch points 270, 272, or both may be accurately determined, which may improve the accuracy, efficiency, or both of generating a combined image.

Optical axes through the lenses 204, 206 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 204, 206, such that the image sensors may be perpendicular to the respective axes to within a tolerance such as 1%, 3%, 5%, 10%, and/or other tolerances.

The lenses 204, 206 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 204, 206 may include substantially reduced thickness relative to the lengths of the lens barrels securing the lenses 204, 206. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 210, 212.

Images or frames captured by an image capture device, such as the image capture device 100 shown in FIGS. 1A-D or the image capture device 200 shown in FIGS. 2A-C, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may implement some or all of the techniques, examples, or processes described in this disclosure, such as the examples 400, 500, 600, and 650 described in FIGS. 4, 5, 6A, and 6B, respectively, and the process 700 described in FIG. 700.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or snap photograph) received via the user interface 364 may be passed on to the image capture device 340 via the communications link 350.

The image capture device 340 and/or the personal computing device 360 may be used to implement some or all of the techniques, examples, or processes described in this disclosure, such as the examples 400, 500, 600, and 650 described in FIGS. 4, 5, 6A, and 6B, respectively, and the process 700 described in FIG. 700.

Figure 4:
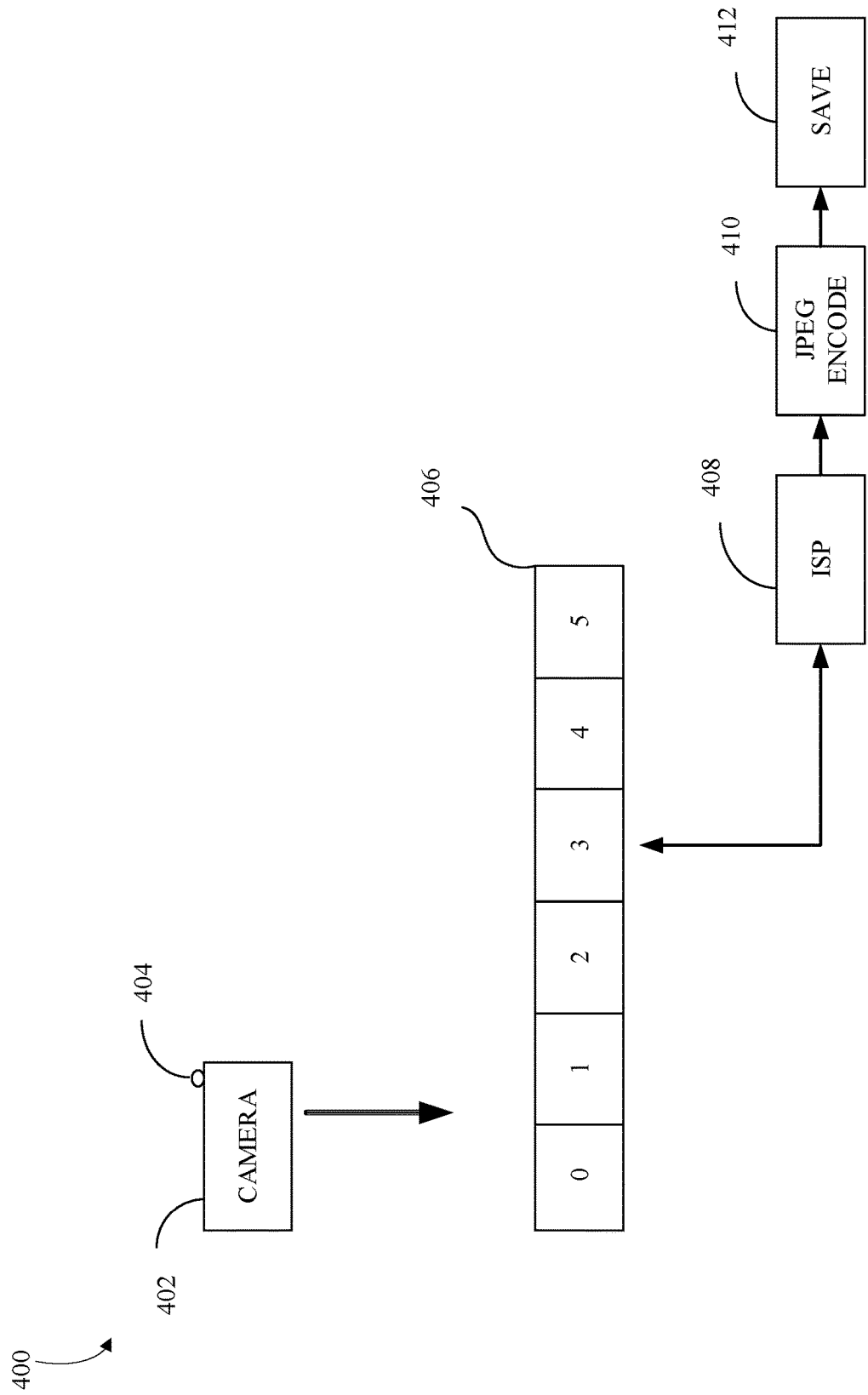
FIG. 4 is a block diagram of an example of an implementation of zero shutter lag in accordance with implementations of this disclosure.

FIG. 4 is a block diagram of an example 400 of an implementation of zero shutter-lag in accordance with implementations of this disclosure. The example 400 is illustrative of an implementation of a ZSL mode. Other implementations may be available consistent with the teachings herein. The example 400 includes a camera 402, which is an example of an image capture device, such as the image capture device 100 of FIGS. 1A-1D, the image capture device 200 of FIGS. 2A-2B, the image capture device 310 of FIG. 3A, or the image capture system 330 of FIG. 3B. The camera 402 can include a processing apparatus, such as the processing apparatus 312 of FIG. 3A or the processing apparatus 362 of FIG. 3B, that implements the zero shutter-lag described herein. The camera 402 includes a shutter button 404 for snapping pictures. The shutter button 404 can be part of a user interface of the camera 402. The user interface can be as described with respect to the user interface 320 of FIG. 3A.

In the ZSL mode, image sensors (not shown) of the camera 402 may be configured to receive images (such as preview images) at a high resolution. The image sensors can be, or can be similar to, at least one of the image sensor 240 or the image sensor 242 of FIG. 2C, the image sensor 314 or the image sensor 316 of FIG. 3A, or the image sensor 342 or the image sensor 344 of FIG. 3B. In an example, the preview images may be used, by the user, for framing. In another example, the preview images may be received even when the user is not framing the image (such as, for example, when the user is simply holding the camera 402 to the user's side). The image sensors may be configured to receive the preview images at a high resolution (such as 12 megapixels, or another high resolution) and at a certain frame rate (such as a frame rate of 30 frames (e.g., images) per second, or another frame rate).

The received preview images can be saved to a circular buffer 406. The circular buffer 406 is shown as including six locations (e.g., memory locations); namely locations 0, 1, . . . , and 5. However, the circular buffer can include more or fewer locations. When the user is not capturing images (such as by pressing the shutter button 404), the received preview images are buffered (e.g., saved temporarily) in the circular buffer 406. As such, a first preview image is stored in the location 0 of the circular buffer 406, a second preview image is stored in the location 1 of the circular buffer 406, and so on. The seventh image is stored in the location 0 and overwrites the first image, the eighth image is stored in the location 1 and overwrites the second preview image, and so on.

The user captures an image by, for example, pressing the shutter button 404. Accordingly, a shutter press event can be received by the processing apparatus.

In an example, the last preview image stored in the circular buffer can be used as the image captured by the user. However, as the rate of receiving preview images can be significantly faster than receipt of the shutter event, the preview image that is selected may be an image that is at least a few frames subsequent to the shutter event press.

As such, in another example, a timestamp can be associated with each preview image stored in a respective location of the circular buffer 406. The preview image of the circular buffer 406 that is associated with the timestamp that is closest to the timestamp of the shutter press event can be used (e.g., selected) as the image captured by the user. The example 400 illustrates that the preview image at the location 3 of the circular buffer 406 is the selected preview image.

The selected preview image can be further processed. In the example 400, the preview image is processed by an image processing unit 408, encoded, such as by a JPEG encoder 410, and saved by a module 412, which saves the encoded image to, for example, a memory, such as a memory card or a memory module of the camera 402. For example, the selected preview image may be a raw image format. After processing the raw image by the image processing unit 408, a YUV (or some other color space) image may be created and a JPEG (or some other image format) image can be generated. The JPEG image can then be saved. In other examples, additional or other further processing can be performed on the selected preview image. A more detailed example of an image processing pipeline is described with respect to FIG. 6A.

Figure 5:
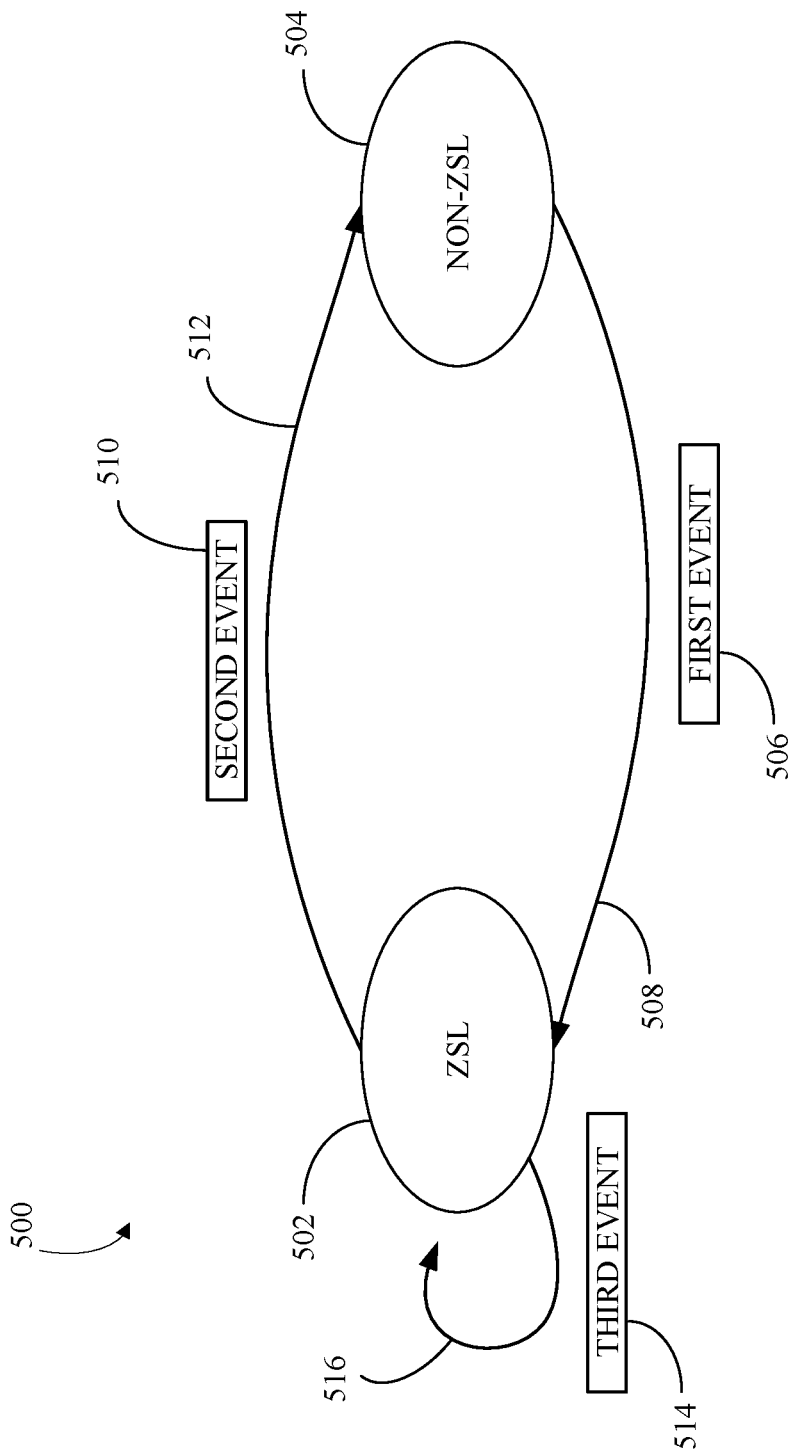
FIG. 5 is a diagram of an example of mode transitions diagram of an image capture device to and from zero shutter lag mode in accordance with implementations of this disclosure.

FIG. 5 is a diagram of an example 500 of mode transitions diagram of an image capture device to and from zero shutter lag mode in accordance with implementations of this disclosure. The example 500 includes a zero shutter-lag (ZSL) mode 502 and a non-ZSL mode 504. As described above, in the ZSL mode 502, the image capture device uses (e.g., consumes) more battery energy than in another mode that requires less battery energy than the ZSL mode. The mode that requires less battery energy than the ZSL mode is referred to herein as the non-ZSL mode 504.

The example 500 can be implemented by an image capture device, such as the image capture device 100 of FIGS. 1A-1D, the image capture device 200 of FIGS. 2A-2B, the image capture device 310 of FIG. 3A, or the image capture system 330 of FIG. 3B. The example 500 can be implemented by a processing apparatus of the image capture device. The processing apparatus can be the processing apparatus 312 of FIG. 3A or the processing apparatus 362 of FIG. 3B. The example 500 can be implemented as executable instructions that can be stored in a memory, such as a memory of the processing apparatus, and executed by the processing apparatus to change the mode of the image capture device from the ZSL mode 502 to the non-ZSL mode 504 and from the non-ZSL mode 504 to the ZSL mode 502.

In the case that the image capture device is in the non-ZSL mode 504, in response to a first event 506, the mode of the image capture device can be changed to the ZSL mode, as shown by a transition 508. That is, for example, the processing apparatus can set (e.g., configure) the image capture device to be in the ZSL mode 502. The processing apparatus can perform additional operations when the image capture device is set to the ZSL mode 502.

In the case that the image capture device is in the ZSL mode 502, in response to a second event 510, the mode of the image capture device can be changed to the non-ZSL mode 504, as shown by a transition 512. That is, for example, the processing apparatus can set (e.g., configure) the image capture device to be in the non-ZSL mode 504. The processing apparatus can perform additional operations when the image capture device is set to the non-ZSL mode 504.

In the case that the image capture device is in the ZSL mode, in response to a third event 514, the mode of the image capture device is not changed, as shown by a transition 516. The transition 516 may not be an actual transition. That is, the mode of the image capture device may not be in fact be changed from the ZSL mode 502 to the ZSL mode 502. Rather, the ZSL mode 502 is not changed, and, as further described below, the processing apparatus may execute one or more operations in response to the third event 514.

As mentioned above, the non-ZSL mode 504 is a mode in which the image capture device is operating in low power. For example, the non-ZSL mode 504 can be useful when the user of the image capture device is framing a scene for capture.

The first event is indicative of the image capture device entering the ZSL mode 502. The image capture device entering the ZSL mode 502 can mean that the image capture device has already entered the ZSL mode. The image capture device entering the ZSL mode 502 can mean that the image capture device is likely to enter the ZSL mode. Likely to enter the ZSL mode can mean that the user is imminently likely to capture a photo, such as by pressing the shutter button.

Examples of the first event 506 are now provided.

In an example, the first event 506 can be a shutter press event. The shutter press event can be received by the processing apparatus in response to the shutter closing in order to capture a photo. In an example, the shutter press event can be received when the user manually presses the shutter button. In an example, the image capture device can include one or more microphone openings for receiving voice or other audio commands. As such, the user can issue a voice command that can be interpreted as a command to cause the shutter to close thereby capturing a photo. Illustrative examples of voice commands that can cause the image capture device to capture a photo can include "cheese," "smile," "camera, take photo!" or "hey camera, capture!"

In another example, the image capture device can support a feature that may be referred to a "surprise me" mode. In such a mode, the image capture device, or a component thereof, may constantly perform scene detection and, according to the scene, automatically capture photos. The photos can be captured at regular intervals, based on analyzing preview frames, other criteria, or a combination thereof. As such, the first event 506 can be the receipt of a voice command, such as "hey camera, surprise me!" or the configuring of the operating mode "surprise me" mode of the image capture device.

The first event 506 can be an LCD touch event. In an example, the image capture device may be configured to enter a sleep mode when no activity is detected within an inactivity period. In an example, the inactivity period can be 60 seconds; however, other inactivity periods are possible. As such, if no activity is detected within the inactivity period, then, to preserve battery energy, an LCD display, such as described with respect to the user interface 320 of FIG. 3A, may be disabled, dimmed, blanked out, blacked out, or the like. When the user touches the LCD display (whether the image capture device is or isn't in sleep mode), an LCD touch event can be received by processing unit. In an example, the user may touch the LCD display presumably because the user intends to frame a scene for capturing a photo. As such, the LCD touch event can indicate that the user is likely to capture a photo in the very near future.

The first event 506 can be a pick-up event. In an example, the image capture device may be laid idly, such as on a table. Since the image capture device is detected to be idle, it may be set to a non-ZSL mode. When the user picks up the image capture device, a pick-up event can be received by the processing apparatus. The pick-up event can indicate that the user is likely to capture a photo in the very near future. The pick-up event can be detected based on sensor information. For example, sensor information from an inertial measurement unit (IMU), a global positioning system (GPS) receiver, a gyroscope, other sensors, or a combination thereof, can be used to detect that the image capture device has moved from a stationary position.

The first event 506 can be a photo-mode event. In an example, the user may switch the image capture device from another mode to the photo mode. For example, the image capture device can capture videos (a series of images with or without corresponding sound) or single images. Via the user interface of the image capture device, the user can toggle between the video mode and the photo mode. Toggling to the photo mode can be, or can cause the generation of, the photo-mode event.

The first event 506 can be a half-shutter press event. In an example, the image capture device can be a digital single-lens reflex (DSLR) device. As such, a half press of a shutter button of the image capture device can be used for auto-focus, which includes at least one of automatic flash or automatic exposure.

In response to the first event 506, and as described above, the image capture device is configured to be in high resolution mode before capturing the photo. That is, for example, image sensors of the image capture device can be reconfigured to be in high resolution mode (e.g., 12 megapixels) and an image processing pipeline can be configured for receiving and further processing the raw photo captured by the sensors. As such, the image capture device is configured to be in the ZSL mode whereby no delay is incurred between the time that the shutter is pressed (or caused to be pressed) and to time of capturing an image. In ZSL mode, the image capture device may operate as described with respect to FIG. 4.

The image processing pipeline may be implemented, at least partially, by one or more hardware components, such as a system-on-chip (SoC). Setting up, configuring, and using the SoC for image processing can consume an insignificant amount of battery energy.

It is noted that in the case that the first event 506 is a shutter press event, then a delay is experienced with respect to the image captured in response to the first shutter press. That is, a delay is experienced with respect to the first image that is captured when the shutter event is received, if the image capture device is not already in the ZSL mode 502. However, no delay is experienced with respect to subsequent images, as described below.

Additionally, in response to the first event 506, the processing apparatus of the image capture device can start a timer. In an example, the timer can be started before the photo is captured. In another example, the timer can be started after the photo is captured. In yet another example, the timer can be started after the captured photo is processed and saved. The timer can be set to expire in a predetermined period. In an example, the predetermined period can be 20 seconds, 15 seconds, fewer, more, or other number of seconds. In an example, the predetermined period can be provided by the user as a configuration of the image capture device. In another example, the predetermined period can be based on machine learning. In a simple example, the processing apparatus, or some other component of the image capture device can accumulate the times between receipt of the first event 506 (other than a shutter press event) and the time that the user captures a first photo after receipt of the first event 506. The accumulated times can be used to set the predetermined period. For example, the predetermined period can be set to the average of the collected times. For example, the predetermined period can be set to a rolling average of the last predetermined number of accumulated times. For example, the last predetermined number of accumulated times can be the last 10, 20, more, fewer, or other number of accumulated times. As further described below, if another photo is not captured before the timer expires, the image capture device can be set to the non-ZSL mode 504.

Examples of the second event 510 are now provided.

The second event 510 can be a timer expired event. As such, for example, if the user does not capture (such as by pressing the shutter) a photo within the predetermined period, the image capture device is configured to exit the ZSL mode and is configured to be in a non-ZSL mode that consumes less energy than the ZSL mode. For example, the non-ZSL mode can be a preview mode.

The second event 510 can be a mode-change event. For example, the user may manually set the mode of the image capture device to be other than the ZSL mode. In an example, a video mode (whereby the image capture device captures video) may be a non-ZSL mode. As such, setting the image capture device to the video mode can cause the ZSL mode to be exited. Additionally, the timer can be cancelled when the mode-change event is received.

The second event 510 can be low-battery event. In an example, if the estimated remaining battery life is below a threshold percentage, then the image capture device is set to be in the non-ZSL mode. In an example, the threshold percentage can be 20%. However, other threshold percentages are possible. Additionally, the timer can be cancelled when the low-battery event is received. In an example, when the estimated remaining battery life is at or below the threshold percentage, the image capture device is not set to the ZSL-mode in response to receiving the first event 506.

The second event 510 can be a non-photo-mode event. In an example, the user may switch the image capture device from the photo-mode to another mode. For example, the image capture device can capture videos (a series of images with or without corresponding sound) or single images. Via the user interface of the image capture device, the user can toggle between the video mode and the photo mode. Toggling to the video mode can be, or can cause the generation of, the non-photo-mode event.

Examples of the third event 514 are now provided.

The third event 514 can be a shutter-press event, such as described with respect to the first event 506. As such, if a shutter-press event is received while the image capture device is in ZSL mode, then the timer can be reset to the predetermined period.

The third event 514 can be a forced-ZSL event. For example, the user can issue a command (such as via an interface of the image capture device) such that the image capture device does not exist the ZSL mode when the timer expires. The command whereby the image capture device does not exist the ZSL mode can be, or can cause the generation of, the forced-ZSL event.

The third event 514 can be an extend-timer event. For example, the user can issue a command (such as via an interface of the image capture device) to extend the timer. In an example, the timer may be extended by the predetermined period. In an example, the user can provide a time (i.e., the predetermined period) by which the timer is to be extended.

Figure 6A:
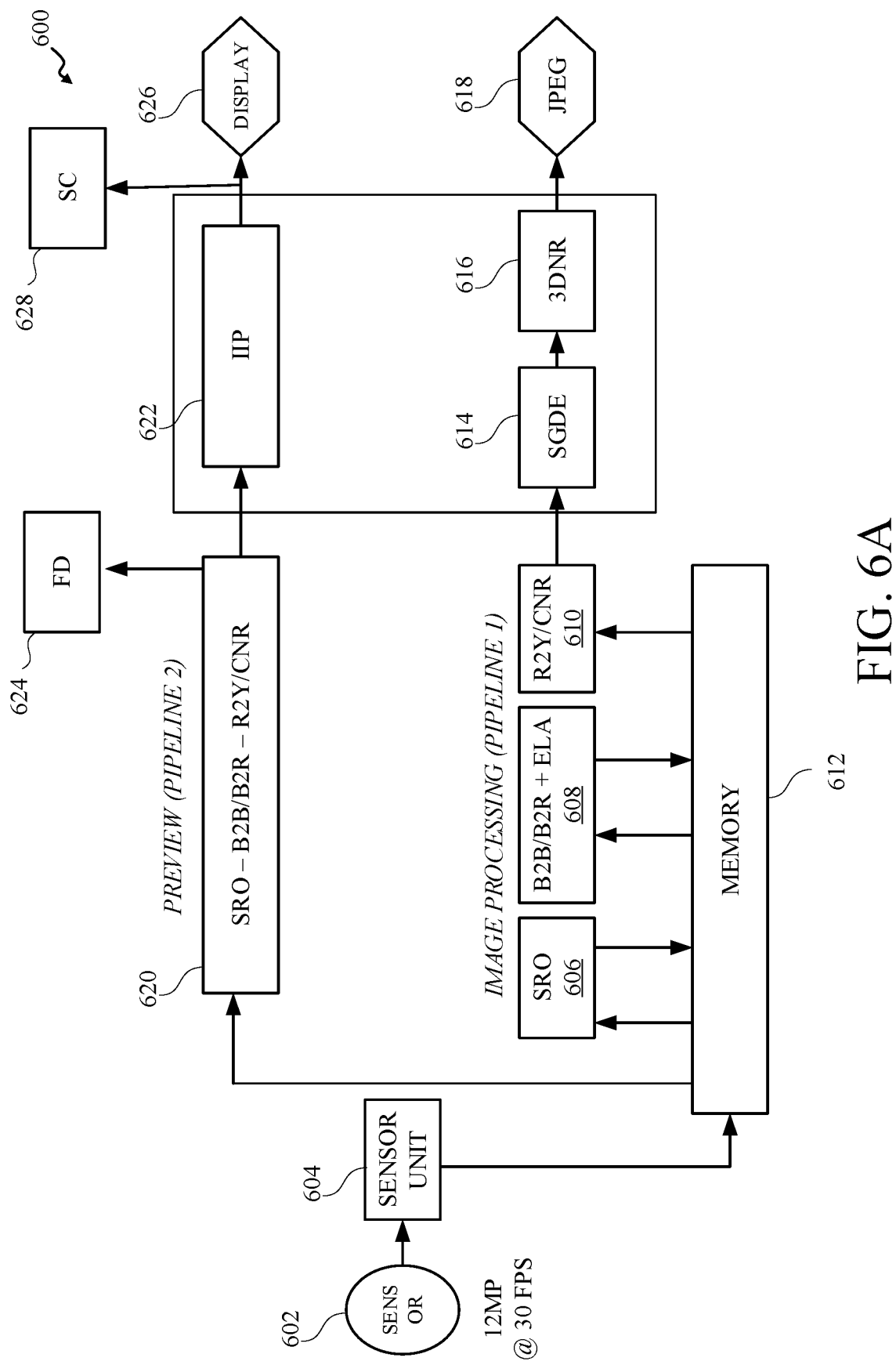
FIG. 6A is a functional block diagram of an example of an image processing and coding pipeline in zero shutter-lag mode in accordance with implementations of this disclosure.
Figure 6B:
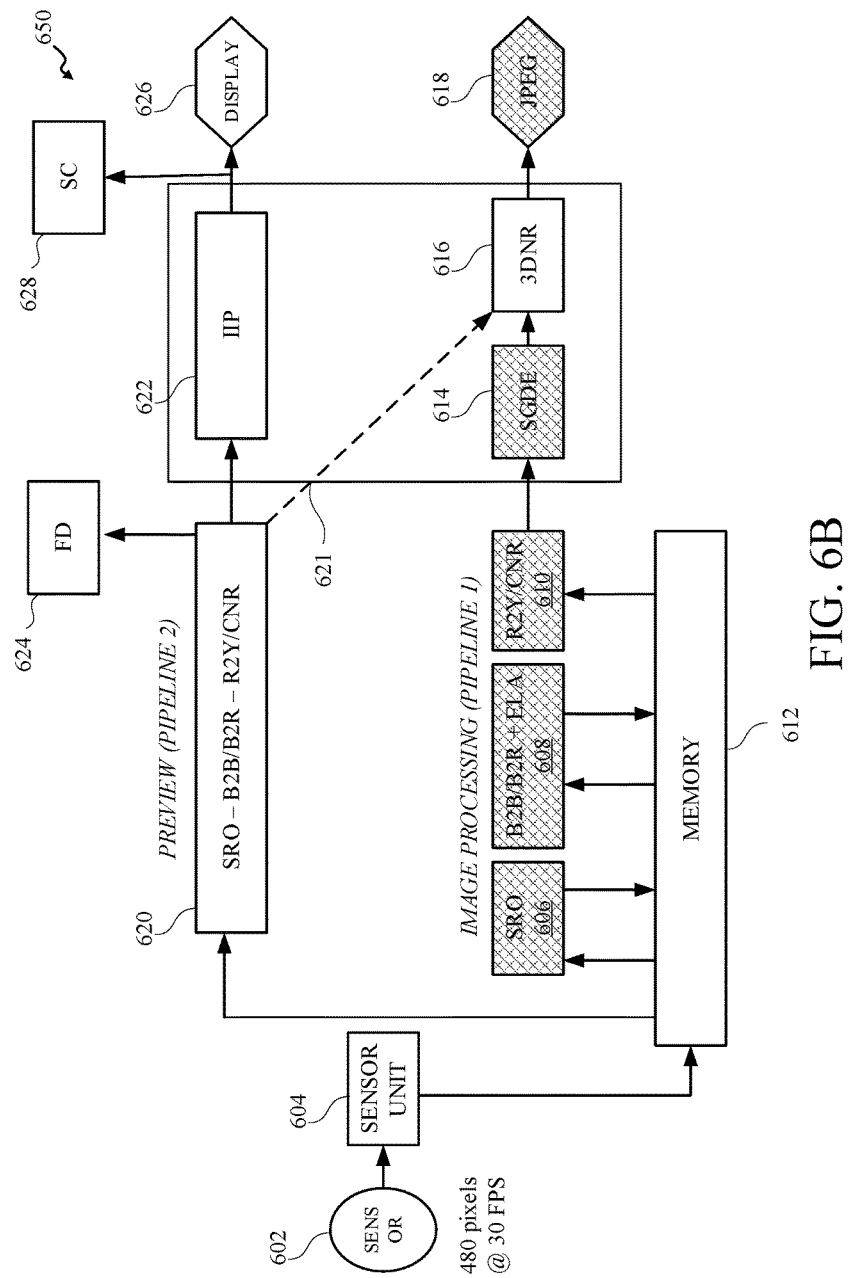
FIG. 6B is a functional block diagram of an example of an image processing and coding pipeline in non-zero shutter-lag mode in accordance with implementations of this disclosure.

FIG. 6A is a functional block diagram of an example 600 of an image processing and coding pipeline in zero shutter-lag mode in accordance with implementations of this disclosure. FIG. 6B is a functional block diagram of an example 650 of an image processing and coding pipeline in non-zero shutter-lag mode in accordance with implementations of this disclosure.

The processing pipelines of the examples 600 and 650 can be included in or performed (e.g., executed, etc.) by an image capture device. The image capture device can be the camera 402 of FIG. 4, the image capture device 100 of FIGS. 1A-1D, the image capture device 200 of FIGS. 2A-2B, the image capture device 310 of FIG. 3A, or the image capture system 330 of FIG. 3B. The operations of the examples 600 and 650 can be included in or performed by a processing apparatus of the imaging device, such as the processing apparatus 312 of FIG. 3A or the processing apparatus 362 of FIG. 3B.

A comprehensive understanding of the operations of an image capture device when in ZSL mode (such as the example 600) and when in non-ZSL mode (such as the example 650) is not necessary to the understanding of the teachings herein. As such, a detailed description of the examples 600 and 650 is omitted. The examples 600 and 650 are mere examples of the operations of an image capture device in ZSL mode and in non-ZSL mode, respectively. Other operations, steps, sequence of operations, or the like can be included in or performed by other implementations of ZSL mode and non-ZSL mode.

A noteworthy difference between the example 600 and the example 650 is that an image sensor 602 of the example 600 is configured to capture data at a high resolution whereas the image sensor 602 of the example 650 is configured to capture data at a lower resolution. The high resolution of the example 600 is shown as being 12 megapixels. However, other high resolutions are possible. The lower resolution of example 650 is shown as being 480 pixels. However, other lower resolutions are possible.

Another noteworthy difference is that, as further described below, many of the operations of the example 600 are disabled (as indicated by the patterned background) in the example 650. As such, more battery energy may be consumed when the image capture device is configured to perform the operations of the example 600. That is more battery energy is consumed when the image capture device is operating in the ZSL mode than when the image capture device is operating in the non-ZSL mode. Additionally, a delay (such as between the time that the user presses a shutter button and the time the image capture device captures a photo) may be experienced by the user because, for example, at least some components of the example 600 may need to be configured to process a captured, high-resolution image.

In the non-ZSL mode (e.g., when the image capture device is configured to perform the operations of the example 650), minimal processing is performed on a captured image in order to convert the captured image into a preview image so that the preview image can be seen by a user, such as, for example, on an LCD display of the image capture device.

As already mentioned, battery energy can be preserved in the non-ZSL mode due in part to the generating of low-quality output images from the image sensors and due in part to the simplified (e.g., reduced) processing on the low-quality output images.

The example 600 illustrates two pipelines. A first pipeline (PIPELINE 1 in FIG. 6A) is for processing of a captured image (e.g., the image that is captured when the user presses the shutter button) and a second pipeline (PIPELINE 2 in FIG. 6A) for providing a preview image.

A sensor unit 604 may receive an input image signal from the image sensor 602. The image sensor 602 can be one or more image sensors. The image sensor 602 can be, or can be similar to, at least one of the image sensor 240 or the image sensor 242 of FIG. 2C, the image sensor 314 or the image sensor 316 of FIG. 3A, or the image sensor 342 or the image sensor 344 of FIG. 3B.

The input image signal may be received in a defined format, such as a format of the image sensor, which may be referred to herein as "raw," such as "a raw image," "raw image data," "raw data," "a raw signal," or "a raw image signal." The input image signal may be in a Bayer format, wherein a respective pixel may be one of a combination of adjacent pixels, such as a combination of four adjacent pixels, of a Bayer pattern. Other configurations may be used. For example, the raw image signal may be in a format such as RGB format, which may represent individual pixels using a combination of values or components, such as a red component (R), a green component (G), and a blue component (B). In some implementations, the image processing and coding pipeline (PIPELINE 1 of FIG. 6A) may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats. In an example, the input image signal may include first image data in an unsigned 14-bit Bayer format.

As shown in FIG. 6A, the example 600 includes a sensor unit 604 for receiving the input image signal from the image sensor 602. The sensor unit 604 may decompress the input image signal from the image sensor 602 to obtain the first image data. The sensor unit 604 may perform blackpoint removal for the first image data.

The first image data can be written (e.g., output, saved, etc.) to a memory 612, which can be RAM memory.

In an implementation, the example 600 can include one or more image compression (CX) units (not shown) and one more image uncompression (UCX) units (not shown). As such, when image data (such as the first image data) is written to the memory 612, the image data can first be compressed using one or more of the image compression units. The compression may be performed using a lossy compression mode or a lossless compression mode. The compression mode may be obtained based on bandwidth constraints. Compressing the image data may reduce bandwidth and memory resource utilization. In some implementations, knee tables may be used. The knee tables may be modified or updated periodically, such as on a per-frame basis. Using knee tables may include double-buffering. For example, the first image compression unit may compress the unsigned 14-bit Bayer format image data, or a signed 15-bit Bayer format, to an unsigned X-bit Bayer format. Accordingly, the first image data that is output from the sensor unit 604 can be compressed before being saved to the memory 612.

Similarly, in the case that compressed image data is retrieved (e.g., extracted, read, etc.) from the memory 612, the image data can be decompressed by the one or more of the uncompression units. The one or more of the uncompression units may uncompress the first image data. For example, the one or more of the uncompression units may uncompress the unsigned X-bit Bayer format image data to a signed 15-bit Bayer format.

As shown in FIG. 6A, the example 600 includes a sensor readout (SRO) unit 606. The SRO unit 606 may receive the first image data from the memory (which, as mentioned above are uncompressed if they were compressed). The SRO unit 606 may perform dead pixel correction for the first image data. The SRO unit 606 may perform scaling for the first image data. The SRO unit 606 may obtain, such as generate or determine, image capture and processing control statistics, such as Auto-Exposure (AE) control statistics, Auto-White-Balance (AWB) control statistics, Global-Tone-Mapping (GTM) control statistics, Auto Color Lens Shading (ACLS) control statistics, or any other image capture control statistics, based on the first image data. The output of the SRO unit 606 is resaved to the memory 612 (again, the output may be compressed before saving).

As shown in FIG. 6A, the example 600 includes a unit 608 that performs Bayer-to-Bayer conversion, Bayer-to-RGB (B2R) conversion, and long wavelength Noise Reduction Error-Level-Analysis via the ELA unit. The unit 608 can perform a B2B conversion to convert the signed 15-bit Bayer format data to the unsigned 14-bit Bayer format. The unit 608 (specifically, the B2B conversion operation) may obtain (e.g., generate, determine, etc.) High Dynamic Range Tone Control statistics, based on the first image data. The B2B conversion operation may implement denoising.

Subsequent to the B2B conversion, the unit 608 may perform the first Bayer-to-RGB (B2R) operation. The first Bayer-to-RGB operation may convert the first image data from Bayer format to an RGB format, such as an unsigned 14-bit RGB format. The first B2R operation may implement white balancing and demosaicing. Subsequent to the B2R operation, the unit 608 may perform ELA. The output of the unit 608 can be saved (compressed or uncompressed, as described above) to the memory 612.

A unit 610 performs an RGB-to-YUV (R2Y) conversion operation and a Chroma Noise Reduction (CNR) operation. The R2Y operation may convert image data from an RGB format to a YUV format. The CNR operation receives YUV image data, which may be unsigned 10-bit YUV image data. The CNR operation may implement chroma denoising, luma denoising, or both image and implement color correction and chroma denoising.

A smart geometric distortion engine (SGDE) unit 614 receives the output of the unit 610 and performs, on the received image, operations related to warping, such as straightening an image that is warped. A 3-dimensional noise reduction (3DNR) unit 616, which receives the output of the SGDE unit 614, may reduce image noise for a frame based on one or more previously processed frames. The output of the 3DNR unit can be encoded, such as in a JPEG 618 formatted image, and saved, such as to a permanent storage, such as an SD card, a network-based (e.g., cloud-based) location, or the like.

A unit 620 of the second pipeline of the example 600 receives (e.g., reads, extracts, etc.), from the memory 612 the first image data that are saved by the sensor unit 604 and processes the first image data to prepare a second image data for display on a display 626. In an example, the display 626 can be an LED display, such as the LED display 108 of FIG. 1A, an interactive display, such as the interactive display 120 of FIG. 1D, or a user interface, such as the user interface 320 of FIG. 3A or the user interface 364 of FIG. 3B.

The unit 620 performs operations SRO, B2B, B2R, R2Y, and CNR as described with respect to the first pipeline. The output of the unit 620 can be received by a unit 624, which performs face detection. The output of the unit 620 can also be received by a unit 622. The unit 622 is an Image Integrated Processor (IIP). The unit 622 can be a hardware and/or a software unit that provides image processing utilities such as cropping, scaling, warping, rotation, and the like. The output of the unit 622 can be used by a unit 628 for scene classification. The output of the unit 622 can also be provided for display to the display 626.

In the example 650 of FIG. 6B, it is noted again that the image sensor 602 is configured to capture image data at a resolution that is significantly smaller than that of the example 600 of FIG. 6A. Whereas the resolution in the example 600 is 12 megapixels, the resolution in the example 650 is a mere 480 pixels. Additionally, the components of the first pipeline (PIPELINE 1) are disabled in the example 650.

Figure 7:
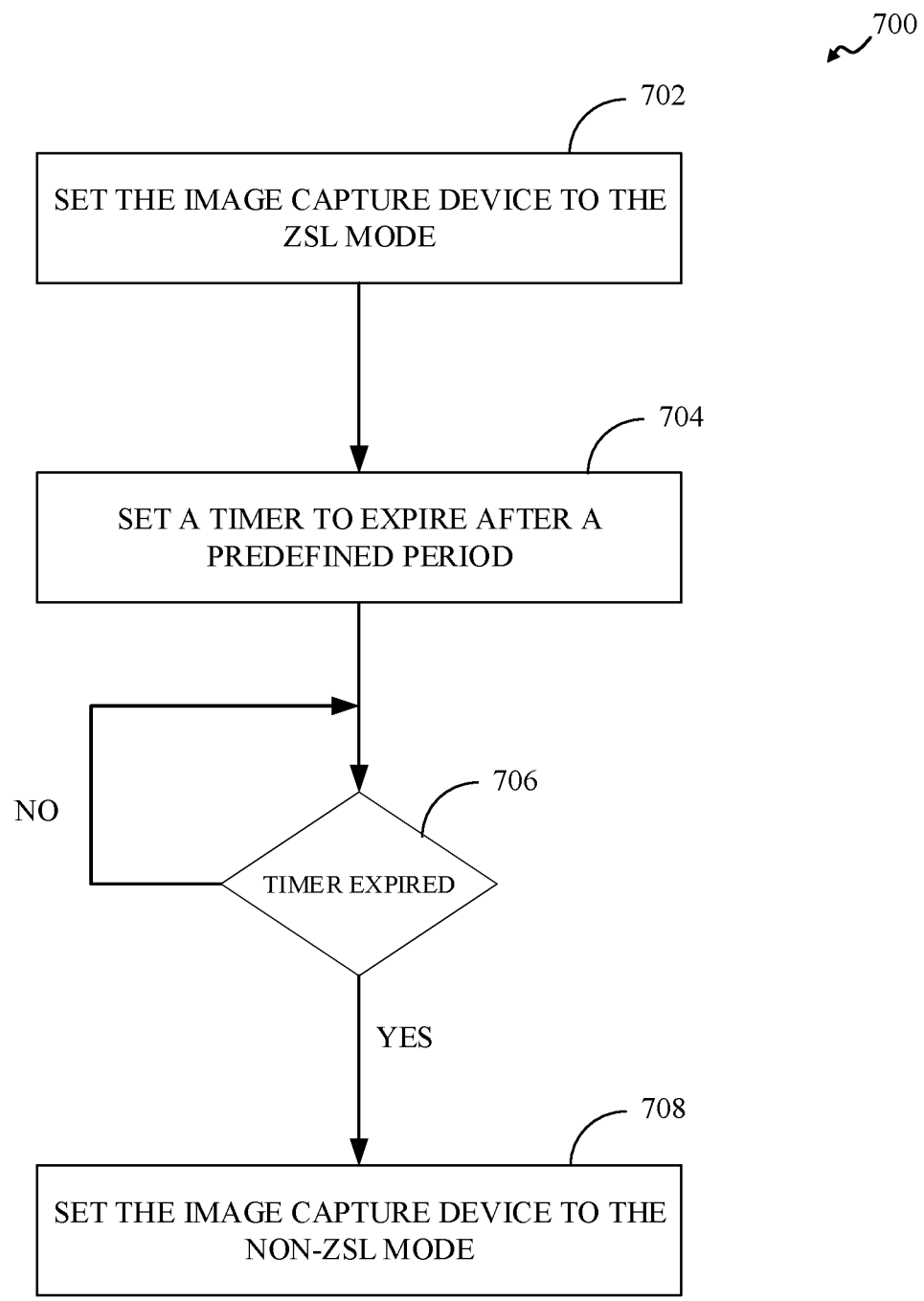
FIG. 7 is a flow diagram of a process for a zero shutter-lag (ZSL) mode of an image capture device in accordance with implementations of this disclosure.

FIG. 7 is a flow diagram of a process 700 for a zero shutter-lag (ZSL) mode of an image capture device in accordance with implementations of this disclosure. The process 700 can be included in or performed (e.g., executed, etc.) by the image capture device. The image capture device can be the camera 402 of FIG. 4, the image capture device 100 of FIGS. 1A-1D, the image capture device 200 of FIGS. 2A-2B, the image capture device 310 of FIG. 3A, or the image capture system 330 of FIG. 3B. The process 700 can performed by a processing apparatus of the imaging device, such as the processing apparatus 312 of FIG. 3A or the processing apparatus 362 of FIG. 3B. In an implementation, the unit 622 may not be used. Rather, the scaling capabilities of the unit 616 may be used instead, as indicated by a dashed line 621. As such, the unit 616 may not be used for noise reduction, but merely for scaling.

The process 700 can preserve battery energy of the image capture device by switching the image capture device from the ZSL mode to another mode (i.e., a non-ZSL mode) when the process 700 detects that the image capture device was not used consistent with the ZSL mode within a predefined period. In an example, the image capture device is not used consistent with the ZSL mode can mean that the user did not capture a photo within the predefined period. More generally, the process 700 can implement mode transitions between the ZSL mode and the non-ZSL mode consistent with the mode transitions diagram of FIG. 5.

At 702, the process 700 sets the image capture device to the ZSL mode. That is, the process 700 configures the image capture device to operate in the ZSL mode. In an example, the process 700 can set the image capture device to the ZSL mode in response to detecting (e.g., receiving, inferring, or detecting in any way) a first event indicative of the ZSL mode. The first event indicative of the ZSL mode can be as described with respect to the first event 506 of FIG. 5. Setting the image capture to the ZSL mode can include setting a sensor of the image capture device to a first resolution that is higher than a second resolution of a non-ZSL mode. In an example, the first resolution can be as described with respect to the resolution of the image sensor 602 of the example 600 of FIG. 6A. In an example, the second resolution can be as described with respect to the resolution of the image sensor 602 of the example 650 of FIG. 6B.

At 704, the process 700 sets a timer to expire after a predefined period. The predefined period can be as described with respect to the predetermined period of FIG. 5. Setting the timer includes that the timer starts counting down until the predetermined period lapses. That is, the timer expires after the lapse of the predetermined period.

At 706, the process 700 determines whether the timer expired. In an example, an interrupt can be sent to the process 700 to indicate that the timer expired. As such, the process 700 can wait until the interrupt is received indicating the timer expired. The interrupt can be a software interrupt. The interrupt can be a hardware interrupt. In an example, the timer can be implemented using a function such as a sleep( ) function. In an example, by setting the timer, the process 700 and/or a thread of the process 700 may be set to a sleeping state (e.g., a non-runnable state) until the timer expires. Other implementations of setting a timer at 704 and detecting whether the timer has or has not expired can be available.

If the timer has not expired at 706, then the process 700 waits at 706. Otherwise, the process 700 proceeds to 708. That the timer expired can indicate that the image capture device was not operated, during the predetermined period (i.e., while the timer was running), in a manner consistent with the ZSL mode. For example, the ZSL mode can indicate that the user intends to be capture a photo. However, no photo was captured during the predetermined period. As such, at 708, the process 700 sets the image capture device to the non-ZSL mode.

In an example, in response to the image capture device capturing a photo while the timer has not expired, the process 700 resets (i.e., restarts) the timer. Resetting the process can include, for example, cancelling the already set timer and setting another timer, as described with respect to 704. In another example, resetting the timer, can mean adding the predetermined period to the timer. Other ways of resetting (or restarting) the timer are possible.

In an example, the first event can include a shutter press event. In an example, the first event comprises an LCD touch event. In an example, the first event can include a movement of the image capture device. In an example, the first event can include a voice command to the image capture device.

In an example, in response to detecting a second event indicative of the non-ZSL mode and the image capture device being in the ZSL mode, the process 700 sets the image capture device to the non-ZSL mode. The second event can be as described with respect to the second event of FIG. 5. In an example, the second event can include detecting that a battery life of a battery of the image capture device being below a threshold. In an example, the threshold can be 20% remaining battery life. In an example, the second event can include detecting that the image capture device is switched to a non-photo mode. For example, the non-photo mode can be a video mode.

For illustration purposes, reducing energy use for enhanced zero shutter lag is described above with respect to capturing photos. That is, for example, when an image capture device is in a photo capture mode. However, the teachings herein can also be used when the image capture device is in other modes. For example, the teachings herein can be applied when the image capture device is set to a video capture mode and it is desirable not to miss any frames after pressing a "record" button, or the like, while at the same time preserving battery energy, as described above.

In a typical scenario, when video recording starts, a shutter press event may be generated. As described above, when a shutter press event is received, the image capture device can be switched to a high-resolution mode, which in turn can mean that some frames may not be recorded immediately after the shutter is pressed. The missed frames are due to, as described above, the stopping of the sensor, the changing of the sensor mode to the high resolution, the preparing the pipeline, and the restarting of the sensor again. So that frames are not missed, a mode transition diagram, such as described with respect to FIG. 5, and a process such as described with respect to FIG. 7, can be implemented when the image capture device is in video mode. That is, for example, upon receiving an event indicative of a video mode, the ZSL mode can be entered and a timer started. If an action consistent with the ZSL mode (e.g., recoding a video) is not received before the timer expires, then the image capture device can be transitioned to a non-ZSL mode.

The teachings herein can be used for energy management of an image capture device where the image capture device may operate in a first mode and a second mode such that the image device consumers more energy in the first mode than in the second mode. In an example, the first mode can be the ZSL mode. In an example, the second mode can be the non ZSL mode.

A process for energy management of an image capture device can include setting the image capture device to the first mode and setting a timer. The process can also include, in response to the timer expiring, setting the image capture device to the second mode. Setting the image capture device to the second mode cancels the first mode. In an example, the process can include, in response to the image capture device being operated in the first mode and while the timer has not expired, resetting the timer. In an example, in response to receiving a command to set the image capture device in the second mode, cancelling the timer.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
a processor configured to:
set the image capture device to a zero-shutter-lag (ZSL) mode in response to a capture of a first image;
start a timer, wherein the processor is configured to set the image capture device to a non-ZSL mode when the timer expires;
restart the timer when a second image is captured while the timer is active,
wherein the second image is a very first image captured after the image capture device is set to the ZSL mode, and
wherein the processor is configured to set the image capture device to the non-ZSL mode when the timer expires; and
in response to detecting an event indicating that no image was captured before the timer expired, set the image capture device to the non-ZSL mode.

2. The image capture device of claim 1,
wherein the processor is further configured to:
accumulate respective time durations, wherein a respective time duration is measured between a first time that the image capture device is set to the ZSL mode and a second time that the image capture device captures a first photo after the image capture device is set to the ZSL mode; and
wherein to start the timer comprises to:
set an expiration time of the timer based on the respective time durations.

3. The image capture device of claim 2, wherein the expiration time is set to an average of the respective time durations.

4. The image capture device of claim 2, wherein the expiration time is set based on a rolling average of a number of the respective time durations.

5. The image capture device of claim 1, wherein an expiration time of the timer is set based on machine learning.

6. A method comprising:
setting a camera to a zero-shutter-lag (ZSL) mode when the camera is turned on;
starting a timer;
storing first preview images in a buffer of the camera, wherein the first preview images have a first resolution; and
in response to the timer expiring:
setting the camera to a non ZSL mode; and
storing second preview images in the buffer of the camera, wherein the second preview images have a second resolution that is lower than the first resolution.

7. The method of claim 6, wherein the buffer is a circular buffer.

8. The method of claim 6, further comprising:
in response to a shutter press event, selecting one of the first preview images or the second preview images as a captured image.

9. The method of claim 8, further comprising:
associating a respective timestamp with at least some of the first preview images and the second preview images.

10. The method of claim 9,
wherein a shutter-press-event timestamp is associated with the shutter press event, and
wherein selecting the one of the first preview images or the second preview images as the captured image comprises:
selecting as the captured image the one of at least some of the first preview images and the second preview images having an associated timestamp closest to the shutter-press-event timestamp.

11. The method of claim 6, further comprising:
restarting the timer in response to an image being captured before the timer expires.

12. The method of claim 11, wherein the image is captured in response to a verbal command.

13. The method of claim 11, wherein the image is captured in response to an analysis of at least one of the first preview images.

14. The method of claim 6, further comprising:
starting the timer in response to an image being captured after the timer expires.

15. The method of claim 14, wherein the image is captured in response to an analysis of at least one of the second preview images.

16. A non-transitory computer-readable storage medium, comprising executable instructions that, when executed by a processor, facilitate performance of operations comprising to:
accumulate respective time durations, wherein a respective time duration is measured between a first time of setting a zero-shutter-lag (ZSL) mode and a second time at which a very first image is captured after the ZSL mode is set;
set an apparatus to the ZSL mode in response to a capture of a first image;
set a timer, wherein the apparatus is set to a non-ZSL mode when the timer expires, wherein the timer is set to expire at an expiration time that is set based on the respective time durations;
reset the timer when a second image is captured while the timer is running; and
in response to detecting an event indicative of the non-ZSL mode, set the apparatus to the non-ZSL mode.

17. The non-transitory computer-readable storage medium of claim 16, wherein the event indicative of the non-ZSL mode comprises that a battery life of a battery of the apparatus is below a threshold.

18. The non-transitory computer-readable storage medium of claim 16, wherein the event indicative of the non-ZSL mode comprises that the apparatus is switched from a mode of capturing still images to a different mode.

19. The non-transitory computer-readable storage medium of claim 16, wherein the event indicative of the non-ZSL mode comprises that the apparatus has been idle.

20. The non-transitory computer-readable storage medium of claim 16, wherein the operations further comprise to:
store first preview images having a first resolution in a buffer when the ZSL mode is set; and
store second preview images having a second resolution in the buffer when the non-ZSL mode is set.

* * * * *